(12) United States Patent
Barrett et al.

(10) Patent No.: US 11,880,392 B2
(45) Date of Patent: Jan. 23, 2024

(54) SYSTEMS AND METHODS FOR ASSOCIATING DATA WITH A NON-MATERIAL CONCEPT

(71) Applicant: 9197-1168 QUÉBEC INC., Montreal (CA)

(72) Inventors: Neil Barrett, Longueuil (CA); Wei Wan, Montreal (CA); Sylvain Pronovost, Montreal (CA); Jonathan Andrew Ketel, Montreal (CA); Susha Pozhampallan Suresh, Montreal (CA); Catherine Lunardi, Montreal (CA); Alex Salomon Thome Da Silva, Montreal (CA); Anirban Aikat, Montreal (CA)

(73) Assignee: 9197-1168 QUÉBEC INC., Montreal (CA)

( * ) Notice: Subject to any disclaimer, the term of this patent is extended or adjusted under 35 U.S.C. 154(b) by 0 days.

(21) Appl. No.: 17/905,008

(22) PCT Filed: Jan. 17, 2022

(86) PCT No.: PCT/CA2022/050060
§ 371 (c)(1),
(2) Date: Aug. 25, 2022

(87) PCT Pub. No.: WO2022/150929
PCT Pub. Date: Jul. 21, 2022

(65) Prior Publication Data
US 2023/0004582 A1    Jan. 5, 2023

Related U.S. Application Data

(60) Provisional application No. 63/138,646, filed on Jan. 18, 2021.

(51) Int. Cl.
*G06F 16/00* (2019.01)
*G06F 16/28* (2019.01)
(Continued)

(52) U.S. Cl.
CPC ........ *G06F 16/285* (2019.01); *G06F 16/2365* (2019.01); *G06F 16/383* (2019.01)

(58) Field of Classification Search
CPC ... G06F 16/285; G06F 16/2365; G06F 16/383
See application file for complete search history.

(56) References Cited

U.S. PATENT DOCUMENTS 10,255,282 B2    4/2019   Kenthapadi et al.
2013/0218626 A1* 8/2013  Duquette ............... G06Q 10/06
                                                              705/7.23
(Continued)

FOREIGN PATENT DOCUMENTS

IN       2620CHE2012 A      5/2016

OTHER PUBLICATIONS

Manley, J. H. "Enterprise information system modeling for continuous improvement." Computers & industrial engineering 31.1-2 (1996): 273-276.*

(Continued)

*Primary Examiner* — Nan Hutton
(74) *Attorney, Agent, or Firm* — Curatolo Sidoti & Trillis Co., LPA; Floyd Trillis, III; Salvatore A. Sidoti

(57) ABSTRACT

The present disclosure provides systems and methods for associating data with non-material concepts that allows for subsequent searching and retrieval of such non-material concepts. A concept definition is received that defines a
(Continued)

concept identifier used for identifying data associated with the concept, and a plurality of discrete stages of the concept. Retrieved data is analyzed to determine if the data corresponds to the concept, and to determine at least one discrete stage of the concept definition that the data corresponds to. The data is stored in association with the concept identifier and the at least one discrete stage to allow for subsequent searching and retrieval. When a search request relating to the concept is received, the data associated with the different stages of the concept can be retrieved and output in a manner to capture the holistic nature of the concept.

20 Claims, 7 Drawing Sheets

(51) Int. Cl.
*G06F 16/23* (2019.01)
*G06F 16/383* (2019.01)

(56) References Cited

U.S. PATENT DOCUMENTS

| | | |
|---|---|---|
| 2016/0292305 A1 | 10/2016 | Hu et al. |
| 2020/0051093 A1 | 2/2020 | Rezaei et al. |
| 2020/0074369 A1* | 3/2020 | Arcolano ......... G06Q 10/06313 |
| 2020/0293712 A1* | 9/2020 | Potts ...................... G16H 10/60 |
| 2021/0149899 A1* | 5/2021 | Gutiérrez ................ G06F 9/451 |

OTHER PUBLICATIONS

Fenner, Audrey. "Placing value on information." Library philosophy and Practice 4.2 (2002): 2002.*

International Search Report for App. No. PCT/CA2022/050060 dated Mar. 17, 2022.

Written Opinion for App. No. PCT/CA2022/050060 dated Mar. 17, 2022.

* cited by examiner

SYSTEMS AND METHODS FOR ASSOCIATING DATA WITH A NON-MATERIAL CONCEPT

CROSS REFERENCE TO RELATED APPLICATIONS

This application is a national stage application of International Application No. PCT/CA2022/050060, filed 17 Jan. 2022, which claims the benefit of the filing date of U.S. Provisional Patent Application Ser. No. 63/138,646, filed 18 Jan. 2021, both of which applications are incorporated herein by reference.

TECHNICAL FIELD

The present disclosure relates to data classification and retrieval and in particular to associating data with a non-material concept.

BACKGROUND

A fundamental process in innovation is searching for information. This information is typically related to a person's goals, e.g. the innovation they're attempting to create. A part of this effort is discovering related work. For example, most academic publications include a background section describing related work.

Current techniques for information retrieval make an assumption that a user's query is to be matched against existing material such as documents. A search engine such as that provided by Google® is an information retrieval system. Google's search illustrates the IR assumption described above: each link brings a user to an existing document or web page in other words, a tenet of information retrieval is the existence of material that corresponds to a user's query.

In the case of concepts such as innovation, projects, etc., however, multiple files relate to various aspects of the concept. For example, multiple files document the course of innovation. These can include project planning and scoping documents to experimental results and scorecards. This information tends to live in disparate sources, locations and formats. Rarely is the innovation, the collection of all documentation along with the relationship between documents, represented or captured, yet those participating in the innovation are fundamentally aware of the innovation's holistic nature. Users cannot easily and quickly find all project documents related to an innovation project or initiative. This leaves the user with an incomplete picture of related work and makes it difficult for an institution or person to avoid past mistakes.

Search and retrieval of data associated with innovation projects thus represents a particular challenge to traditional IR techniques. While a particular search term may be used to retrieve certain documents, the holistic nature of an innovation project, and the relationships between documents, is not retrievable/searchable. These challenges do not exist only in the case of innovation projects, but more generally for any collection of documents related to a concept that has no persistent representation.

Accordingly, systems and methods that enable associating data with non-material concepts remains highly desirable, for instance to allow for subsequent searching and retrieval.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with one aspect of the present disclosure, a system for associating data with a non-material concept is disclosed, comprising: a processor; and a memory having stored thereon instructions, which when executed by the processor, configure the system to: receive a concept definition comprising a concept identifier and defining a plurality of discrete stages for the non-material concept; determining whether retrieved data is associated with the concept identifier of the concept definition; determining at least one corresponding discrete stage from the plurality of discrete stages of the concept definition that the retrieved data corresponds to: and storing the retrieved data in association with the concept identifier and the at least one discrete stage of the concept definition.

In some aspects of the system, each of the plurality of discrete stages are related to at least one other discrete stage of the plurality of discrete stages.

In some aspects of the system, the retrieved data is retrieved from a private data source.

In some aspects of the system, the retrieved data is retrieved from a public data source.

In some aspects of the system, the retrieved data is retrieved in an original data format, and the system is further configured to convert the retrieved data to a standard data format for use in determining the at least one discrete stage of the concept definition that the retrieved data corresponds to.

In some aspects of the system, the system is configured to determine whether the retrieved data corresponds to the concept identifier of the concept definition by identifying the concept identifier in at least one of an original storage location of the data and the data.

In some aspects of the system, the concept definition defines any one or more of: a data class, a time period, an original data format, a data structure, and data content, for each of the plurality of discrete stages, and wherein the system is configured to determine the at least one discrete stage that the retrieved data corresponds to by comparing the retrieved data with the plurality of discrete stages of the concept definition.

In some aspects of the system, the system is further configured to: receive a search request associated with the concept identifier, retrieve a representation of the concept, and generate an output comprising the representation of the concept.

In some aspects of the system, the system is configured to generate the representation of the concept comprising the plurality of discrete stages, associate the retrieved data with the at least one discrete stage in the representation, and store the representation in association with a unique identifier.

In some aspects of the system, the system is further configured to generate an index comprising the unique identifier in which the representation of the concept is stored in association with, and wherein the representation of the concept is retrieved by accessing the index to retrieve the unique identifier, the representation of the concept being retrieved using the unique identifier.

In accordance with another aspect of the present disclosure, a method of associating data with a non-material concept is disclosed, comprising, receiving a concept definition comprising a concept identifier and defining a plurality of discrete stages for the non-material concept; determining whether retrieved data is associated with the concept identifier of the concept definition; determining at least one corresponding discrete stage from the plurality of discrete stages of the concept definition that the retrieved data corresponds to, and storing the retrieved data in association with the concept identifier and the at least one discrete stage of the concept definition.

In some aspects of the method, each of the plurality of discrete stages are related to at least one other discrete stage of the plurality of discrete stages.

In some aspects of the method, the retrieved data is retrieved from a private data source.

In some aspects of the method, the retrieved data is retrieved from a public data source.

In some aspects of the method, the retrieved data is retrieved in an original data format, and the method further comprises converting the retrieved data to a standard data format for use in determining the at least one discrete stage of the concept definition that the retrieved data corresponds to.

In some aspects of the method, determining whether the retrieved data corresponds to the concept identifier of the concept definition comprises identifying the concept identifier in at least one of an original storage location of the data and the data.

In some aspects of the method, the concept definition defines any one or more of: a data class, a time period, an original data format a data structure, and data content, for each of the plurality of discrete stages, and wherein determining the at least one discrete stage that the data corresponds to comprises comparing the retrieved data with the plurality of discrete stages of the concept definition.

In some aspects of the method, the method further comprises: receiving a search request associated with the concept identifier; retrieving a representation of the concept; and generating an output comprising the representation of the concept.

In some aspects of the method, the method further comprises generating the representation of the concept comprising the plurality of discrete stages, associating the retrieved data with the at least one discrete stage in the representation, and storing the representation in association with a unique identifier.

In some aspects of the method, the method further comprises generating an index comprising the unique identifier in which the representation of the concept is stored in association with, and wherein retrieving the representation of the concept comprises accessing the index to retrieve the unique identifier, the representation of the concept being retrieved using the unique identifier.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
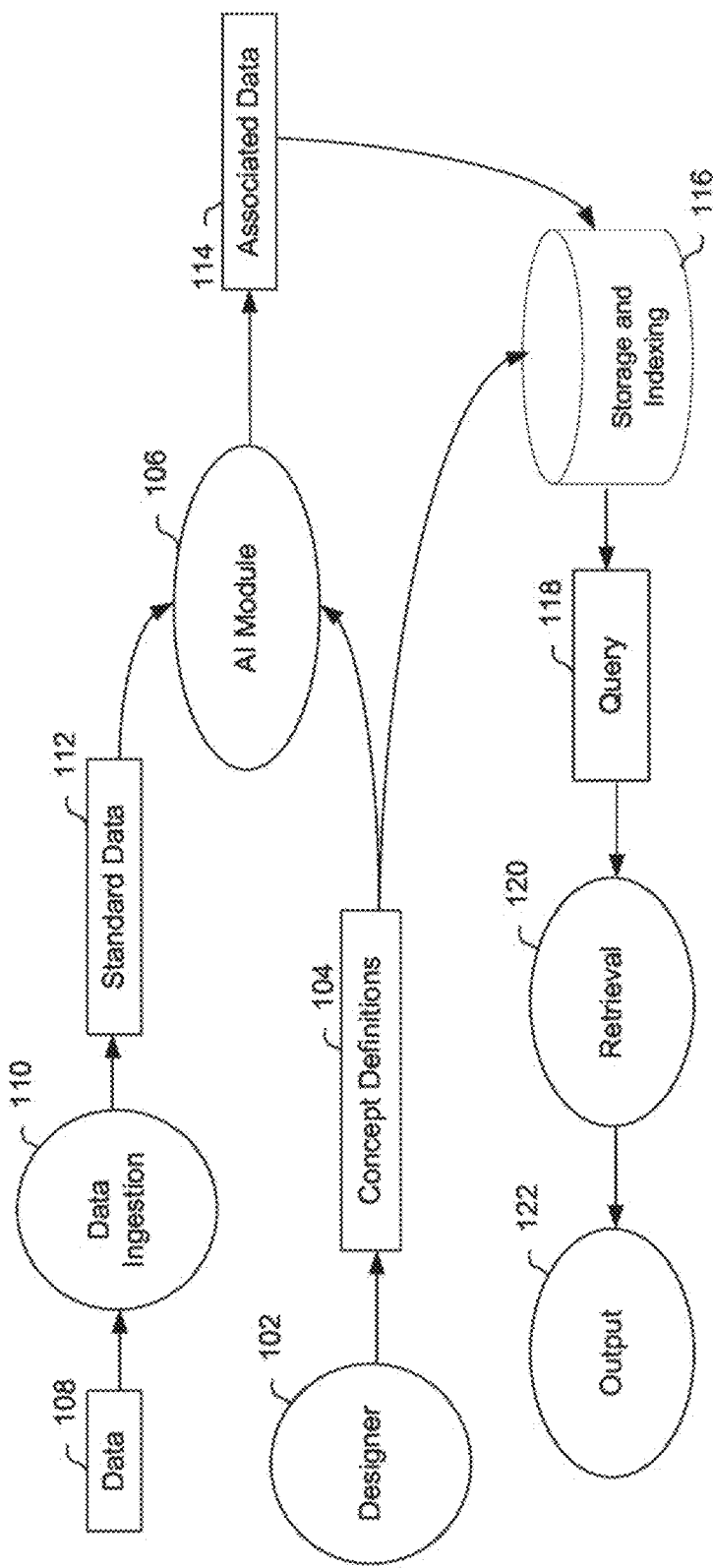
FIG. 1 shows a flow diagram of associating data with non-material concepts and retrieving data associated with the non-material concepts.

The present disclosure provides systems and methods for associating data with non-material concepts that allows for subsequent searching and retrieval of such non-material concepts. While traditional information retrieval techniques perform searching where each returned result corresponds to a material document, the systems and methods disclosed herein associate data with non-material concepts such that the holistic nature of the concept, including different stages of the concept and data associated with the different stages of the concept, can be searched and retrieved.

In accordance with the present disclosure, a concept definition is received that defines a structure to the non-material concept. The concept definition comprises a concept identifier used for identifying data associated with the concept, and a plurality of discrete stages of the concept. A piece of data, such as a document, web page, etc., can be retrieved from public or private data sources and analyzed to determine if the data corresponds to the concept, and if the data corresponds to the concept, determines at least one discrete stage of the concept definition that the data corresponds to. The data is stored in association with the concept identifier and the at least one discrete stage to allow for subsequent searching and retrieval. When a search request relating to the concept is received, the data associated with the different stages of the concept can be retrieved and output in a manner to capture the holistic nature of the concept.

In accordance with the present disclosure, a holistic view of a non-material concept (for example, a complete innovation project) can be searched and retrieved when searching for either the concept itself or when searching for related works to a different concept. This gives users a complete view of non-material concepts such as an innovation project or initiative and helps institutions or individuals build on previous work. The retrieved data related to the non-material concept can be represented and output as a material document for the purpose of search and retrieval. In accordance with the present disclosure, users may be able to search for and interact with a non-material concept, thus providing a complete and holistic view of the non-material concept. An advantage of being able to search and interact with a non-material concept is to provide a better understanding of past work including possibly past mistakes, that could not otherwise be easily searchable or evident from a disparate collection of documents. Accordingly, institutions/people embarking on a similar project can learn from previous projects and avoid past mistakes.

In accordance with the present disclosure, material data is data that has a persistent representation. Material data exist and can be loaded by an application that understands the data format. An example of material data is a Microsoft Word™ or Excel™ document, for example, but is not limited to such, and may also encompass various types of files, a web page, etc. Accordingly, material data is some data having a particular format that may be viewed with a particular application. In contrast, non-material data is data that has no persistent representation. For example, a non-material concept may be related to a collection of material data, but does not itself have a persistent representation. However, in accordance with the systems and methods disclosed herein, it is possible to associate the material data with the non-material concept in a manner that allows for representing the non-material concept with a persistent representation.

While the following description may describe particular implementations of the systems and methods with reference to innovation projects, a person skilled in the art will appreciate that the systems and methods disclosed herein may be applicable to data associated with various types of non-material concepts that do not have a persistent representation, and may in particular be applied to any concept that may be represented by a directed graph or partially ordered set such as initiatives or projects having a workflow or data flow with a plurality of discrete stages.

Embodiments are described below, by way of example only, with reference to FIGS. 1-7.

FIG. 1 shows a flow diagram of associating data with non-material concepts and retrieving data associated with the non-material concepts. Data such as documents, numerical data, graphs, web pages, etc., are stored in various locations such as the Internet, private/public databases, SharePoint™, etc. These data are ingested into a processing system that associates relevant data with a non-material concept, computes relationships between the data, stores these relationships and, upon being queried, retrieves a non-material concept and outputs the data related to the non-material concept, which may for example be a representation of the concept.

Designer 102 is a component of the system and provides a user interface and a mechanism for a user to define a concept definition. A user interacts with designer 102 to define a concept definition which defines a structure of the concept and comprises a concept identifier and a plurality of discrete stages of the concept. A concept identifier may for example be a name of the concept (for example, a project name). In another example, the concept identifier may be a numerical identifier such as a project number, etc. The concept identifier may comprise one or more identifiers (e.g. a project name and a project number). In general, the concept identifier is an identifier that is able to uniquely identify the concept. The plurality of discrete stages of the concept are inter-related, with each discrete stage being related to at least one other discrete stage of the concept. The plurality of discrete stages may vary in time. Each concept definition may thus be represented as a directed graph comprising a plurality of discrete stages as nodes and interdependencies between the plurality of discrete stages such as the order in which the stages occur defining edges connecting the nodes. The user further provides any other relevant information defining each stage via the designer 102, such as a time period that the stage occurred, classes of data and/or data content associated with the stage, etc. Thus, the concept definition captures stages defining the concept, and may define classes of data and/or data content related to each stage, and a workflow/relationships between the different stages.

Figure 2:
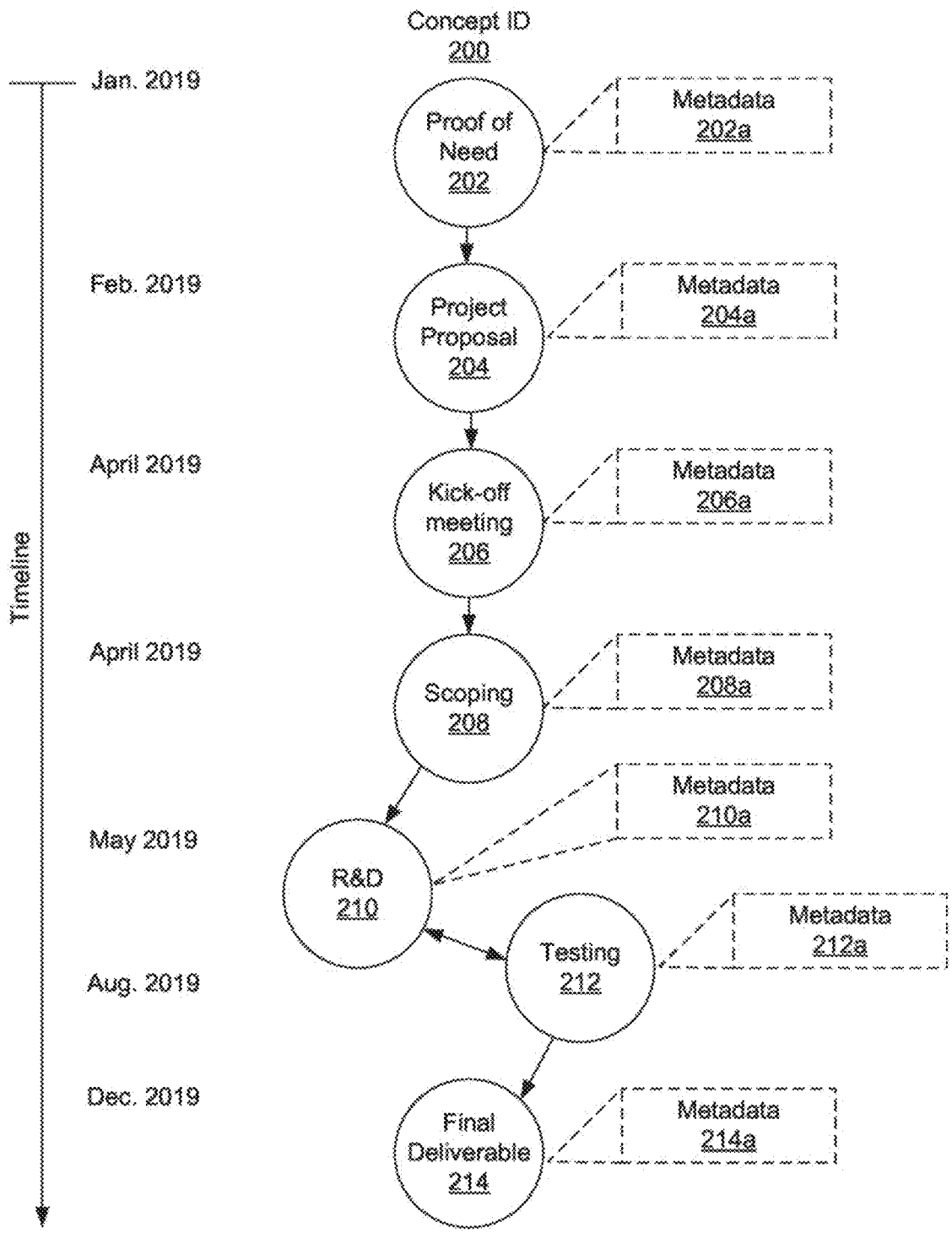
FIG. 2 shows a representation of an example concept definition.

FIG. 2 shows a representation of an example concept definition. The concept definition comprises a concept identifier 200 that is used for identifying the concept. As described above, the concept definition further defines a plurality of discrete stages, which may be represented by nodes in a directed graph. For example, the representation of the concept definition shown in FIG. 2 may represent a particular initiative such as an innovation project. The project has several stages represented as nodes in FIG. 2, starting with proof of need 202, followed by project proposal 204, kick-off meeting 206, scoping 208, R&D 210, testing 212, and lastly a final deliverable 214. Based on the information provided by the user, interdependencies between stages can be defined which are represented by arrows between nodes. For example, project proposal 24 follows proof of need 202, kick-off meeting 206 follows project proposal 204, etc. Stages may also be performed simultaneously or in overlapping relationship to one another. For example, the bi-directional arrow between R&D 210 and testing 212 represents the recursive manner that these stages may be performed. Moreover, based on input provided by the user, metadata may be used to define each of the stages, and metadata 202a, 204a, 206a, 208a, 210a, 212a, and 214a, is shown as associated with respective nodes. The metadata may for example define a time period that the stage occurred, classes of data and/or data content associated with the stage, etc. The directed graph may have associated therewith a timeline in relation to the respective nodes, as for example is shown in FIG. 2. Note that the concept definition may comprise more or less information associated with stages of the concept than that which has been described above.

The specific manner in which the concept definition is defined/received is not particularly limited. For example, a user may be provided with a software tool in a user interface such as the designer 102 that allows them to generate a concept definition in a manner such as that which is represented in FIG. 2. A concept definition could also be viewed as a template from which multiple concept definitions are created, and a user may input information into the template. Alternatively, a user may simply input information defining the concept and stages thereof into the user interface for use by the system in associating data to the concept. That is, a representation of the concept such as that which is shown in FIG. 2 need not necessarily be created by the user of the designer 102, and may instead be created based on the information provided by the user, including after data has been associated to the stages of the concept definition as further described below. Moreover, the concept definition may be represented textually, graphically, a combination of text/graphics, etc., and the representation of the concept definition shown in FIG. 2 is solely for the sake of example only.

Referring back to FIG. 1, concept definitions 114, which comprise the concept definition generated by the designer 102, are passed to an AI module 106 for use in classification of data and associating the data to the concept defined in the concept definition.

Data 108 is provided to a data ingestion component 110. The data 108 may be provided or retrieved from various disparate sources, including public and/or private databases, the Internet, etc. For example, a client may have a private database that they wish to have ingested to associate data to a particular project. In another example, an academic researcher may wish to search all public data related to a particular initiative. The data 108 may be a dataset, wherein some data is associated with the concept and some data is not associated with the concept. The data ingestion component 110 transforms the data 108 into a standard data format 112, which is then passed to the AI module 106 for use in associating the data to the concept defined in the concept definition.

Figure 3:
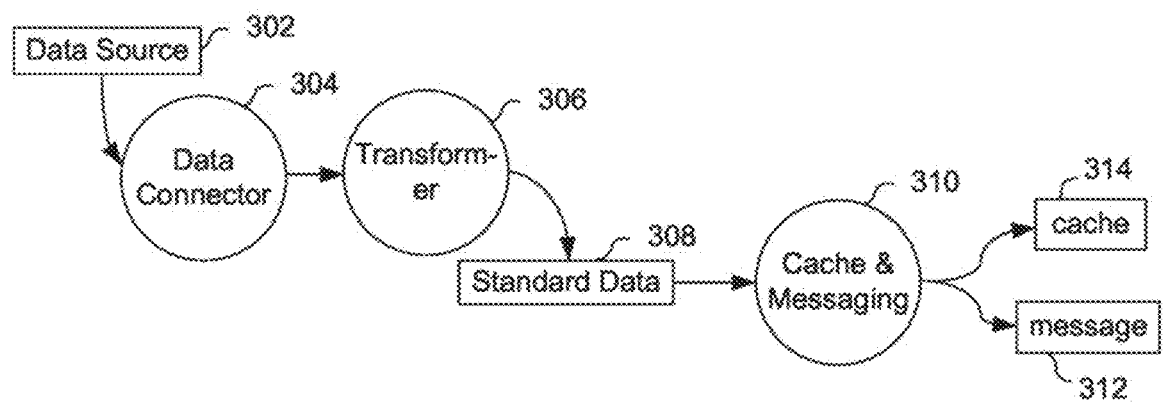
FIG. 3 shows a flow diagram of how data is ingested and transformed for associating data with non-material concepts.

The data ingestion process is more particularly shown in FIG. 3, which shows a flow diagram of how data is ingested and transformed for associating data with non-material concepts. A data connector component 304 connects with a data source 302, which may comprise various data, by running an appropriate application to open the data in its original data format and extract data therefrom. Only one data connector component 304 is shown in FIG. 3 but it would be appreciated that there may be a plurality of data connector components. A transformer component 306 performs a process whereby data in various original formats such as Word, PDF, a database record, etc. are converted into a standard form and format and output as standard data 308. One standard form and format may be JSON with agreed upon structural conventions such as how text or tables are captured. Converting the data to a standard format via the data connector component 304 and transformer component 306 provide an abstraction from the existing original data that allows internal processing used in associating the data to non-material concepts to be agnostic of certain details. The standard data 308 may also have associated metadata that is captured. For example, for any particular data (e.g., a Word document), a processing time timestamp, a unique identifier of the original data (e.g, a Uniform Resource Identifier (URI) or Uniform Resource Locator (URL)), content representation (e.g., sha1 hash), a data creation timestamp, etc., may be captured/stored. In general, only non-sensitive metadata may be stored (e.g. no personal information), though this may depend on the particular application. Further, the original data may or may not itself be stored, as the unique identifier of the original data may be used for retrieving the original data, though one could store the original data for another purpose such as speed in retrieval.

The metadata associated with the standard data, in particular the unique identifier of the original data and the content representation, allows the data ingestion process to identify new, removed, and modified data. For example, new data would have no existing unique identifier whereas modified data may be recognized by changes in timestamp and/or content representation of data associated with an existing unique identifier. Removed or deleted data may be identified by attempting to access the original data using it's unique identifier and determining that the original data no longer exists. A cache and messaging component 310 may send create, update or delete messages 312 based on the metadata associated with the standard data to interested modules/components such as the AI module 106 and storage and indexing component 116 shown in FIG. 1, as described in more detail below. The messages may contain the metadata associated with the standard data as well as any other relevant data, and may for example include the unique identifier of the original data and/or a unique identifier of the standard data (e.g. a URL link, tagged as "url"), a temporary or permanent storage location of the standard data (e.g. Google cloud storage—tagged as "standoc_url"), and an operation (e.g. create—New document, update—old updated document, delete—removed document) etc. Appropriate modules/components may then request the standard data and associated metadata depending on processing needs. Where the standard data is to be processed, such as new or modified data, the cache and messaging component 310 may temporarily store the standard data in a cache 314.

With reference again to FIG. 1, the AI module 106 performs processing on the standard data 112 based on the concept definitions 104 to classify the standard data and associate relevant data with a non-material concept. The AI module 106 may receive a message from the data ingestion component 110, such as message 312 from the cache and messaging component 310 in FIG. 3, and if appropriate, retrieves standard data to be processed from the cache 314. If the message received from the cache and messaging component is to delete data, the AI module 106 would do nothing. The standard data is processed to determine correlation of the data with a concept, and more specifically is processed to determine whether the data is associated with a concept identifier of a concept definition, and to determine a stage of the concept definition 104 that the data is associated with (e.g. a particular project and a node of the project). The AI module 106 uses the concept definitions 104 to group data such as documents by concept and to recognize which stage of the concept each piece of data is associated with. In other words, the AI module 106 attempts to associate data with stages of a concept as defined by the concept definition.

For each data retrieved from the standard data 112, the AI module 106 performs processing to determine whether the data corresponds to a concept identifier from among the concept definitions received. The concept identifier may be derived from the standard data's original location (e.g., subcomponent of a file path. URL of a web page, etc.) or from the data itself (e.g., extracted from a table, header or footer). These identifiers are often in prominent locations of the data are thus typically able to be readily extracted. In some cases, however, a concept identifier may not be readily discernible from the standard data or its metadata. In such situations, the AI module 106 may perform data classification to determine a data class of the standard data, as further described below. Determining the standard data's data class, such as what type of document the standard data best corresponds to, may be used to help identify the concept identifier that the standard corresponds to, such as by determining whether a discrete stage of a concept definition exists that would contain data of the determined data class.

The AI module 106 further performs processing to determine at least one discrete stage of the concept definition the data corresponds to. The data may typically only correspond to one discrete stage of the concept definition, though it is also possible that the data may correspond to more than one discrete stage. Determining the at least one discrete stage of the concept definition that the data corresponds to may be performed using the metadata of the standard data and the metadata of the discrete stages/nodes defined in the concept definition. Additionally or alternatively, the standard data's data class (e.g. whether the standard data is a scoping document, a test document, etc.) may be determined from the standard data by comparing the standard data against known data specimens that have been previously classified and stored. Similarity between standard data and the data specimens may be measured based on the original data format (e.g., docx, xlsx, pdf), general data structure (e.g., number of tables, text blocks, and images), and data content (e.g., main topics, text blocks sections, subsections, and layout). For example, a proposal document may have a generalized specimen format that can be used to identify whether the standard data corresponds to a scoping document and should be associated with a proposal stage of an initiative. Similarly, standard data with numerical values, tables, and graphs may be discernible as data belonging to a testing stage of an initiative or project. The standard data is associated with at least one discrete stage of the concept definition that it best matches based on its data class. The AI module 106 may for example evaluate a distance function that outputs a value indicating matching/distance. When the concept identifier associated with the standard data has already been determined, there are a limited number of discrete stages of the concept definition that the standard data may be associated with.

The AI module 106 may be initially trained by classifying data according to data class using known data specimens and matching to pre-defined stages. Further, any incorrect associations may be identified by a user and correct associations provided as feedback to the AI module 106 for continued learning. The AI module 16 may for example be a function that outputs the distance/similarity value, or it may use another standard classification technique. Alternatively, the AI module 106 could utilize a recurrent neural network, for example, operating on document pairs.

The foregoing processing of determining whether data is associated with a concept identifier and associating the data with a stage of the concept definition may also be performed collectively for groups of related data. Related data may for example comprise data that are part of a same dataset, are associated with a same data location, sub-folder, etc. Performing processing on groups of related data may be beneficial where determinations/associations are challenging, as the group of related data may be compared against concept definitions, data classes, etc., to disambiguate the data which may appear to match several concept definitions or data classes. As one non-limiting example, if a concept identifier is not readily identifiable from data in a dataset, it may be easier to consider the dataset as a whole to find a corresponding concept definition that the dataset matches, and thus determine the concept identifier.

The AI module 106 terminates after processing all standard data and associating relevant standard data with an associated concept identifier and at least one discrete stage of the concept definition. The associated data 114 comprises the standard data that is associated with a concept identifier and discrete stage of the concept definition, which information is sufficient to store the associated data for later retrieval and presentation, as described in more detail below.

Figure 4:
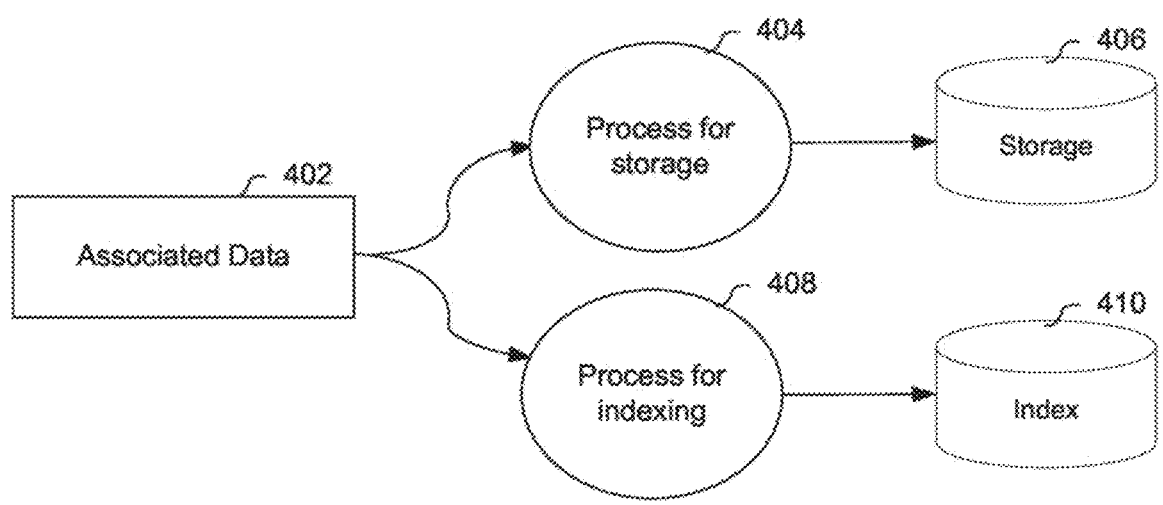
FIG. 4 shows a flow diagram of how associated data is stored and indexed.

The associated data 114 is stored and indexed in a storage and indexing database 116. The concept definitions 104 are also stored in storage and indexing database 116. Other standard data, such as that which is not associated with a concept definition, may also be stored in the storage and indexing database 116 as such data may still be queried/searched. FIG. 4 shows a flow diagram of how the associated data 114 is stored and indexed.

As shown in FIG. 4, associated data 402, such as that which is represented as associated data 114 in FIG. 1, is processed for storage 404. In one implementation, the associated data is processed for storage in association with the concept definition that the respective standard data is associated to. For example, standard data associated with a concept definition may be used to generate/populate a representation of a concept definition by associating each piece of standard data that is associated with the concept identifier to a corresponding stage of the concept represented as a node. In some aspects, such as if a representation of the concept definition is not generated at the initial designer component, a graphical representation of the concept definition, or certain aspects thereof such as certain edges/interdependencies, may be generated based on the associated data. For example, the standard data metadata, such as file name, time created, etc., may be used to infer the relationships between stages. As an example, if two documents are associated with different stages and have different document creation times, the document creation times of the documents may be used to infer which stage occurred first and draw a directed edge between two nodes. If documents associated with different stages share similar document creation times, this may infer that the different stages occurred simultaneously or in overlap. As another example, a CAD model associated with one stage may have a file name of: "Revised design in response to stress test", which could be used to infer that a testing stage and the R&D stage are interrelated. An instance of the concept definition (such as a graphical representation) populated with associated data may be stored in storage 406. The concept definition may also be stored in association with a unique identifier to facilitate retrieval.

Additionally or alternatively, during the storage processing step 404, it is also possible to create other types of data that represents a non-material concept, such as an initiative instance, for the purpose of indexing, storage and retrieval. Creation of this representative data depends on engineering consideration (e.g., storage space or processing time) and user considerations (e.g., importance of the user to solely interact with the non-material concept, preferred representations of the non-material concept to users, etc.). In cases where there is value in creating another representation of the non-material concept then one may be created. For example, the associated data could be summarized, using machine summarization techniques, and the automatically generated summary could be stored as an additional or alternative representation of the non-material initiative instance. This representation may also be stored in association with a unique identifier to facilitate retrieval.

Furthermore, the associated data 402 may be processed for indexing 408. Processing associated data 402 for indexing may comprise generating an index for use in retrieval of the concept definition in response to a user's search query. Having stored the data associated with the concept (e.g by generating a representation of the concept definition), an index may be populated with a record that comprises information such as a storage location of the concept definition, an identifier of the concept definition such as the concept identifier or the unique identifier associated with the concept definition in storage 406, etc. Creating an index populated with such records facilitates retrieval of the concept definition since the storage 406 does not have to be processed to search for a concept definition in response to a search query, but instead the index can be searched more quickly. Processing for storage in an index may include some natural language processing such as language identification, tokenization and calculating asemantic representation of the standard data. The record(s) is/are stored in an index database 410.

Note that while the foregoing description of storage and indexing with reference to FIG. 4 has been in relation to associated data, it will be appreciated that other standard data which has not been associated to a concept definition may also be stored and indexed for the purpose of subsequent searching and retrieval.

With reference again to FIG. 1, a query 118 created by a machine or user to request to retrieve specific information may be received, for example using conventional search infrastructure. When the query 118 is received, a set of validation, authentication and authorization checks may be performed. The query 118 is processed in preparation for submission to an information retrieval module 120, such as an enterprise search system backed by Apache Solr™. The information retrieval module 120 executes a search ranking algorithm on the information stored in the storage and indexing database 116 based on the query 118 to determine results that are relevant to the query. A person skilled in the art will appreciate that various types searching algorithms may be employed.

The results of information retrieval are presented to the user, for example as an output 122 in a user interface. Users may select a particular result, or a result may be automatically selected for them. Results may contain material items (e.g., documents) with no relation to non-material concepts, material items related to non-material concepts such as an initiative instance, or the non-material concept itself through a constructed representation.

If a non-material concept is directly or indirectly selected then a process may be undertaken to reconstruct the non-material concept. For example, a graphical representation of the concept definition and associated data may be loaded from storage and composed into a data structure for presentation.

Figure 5:
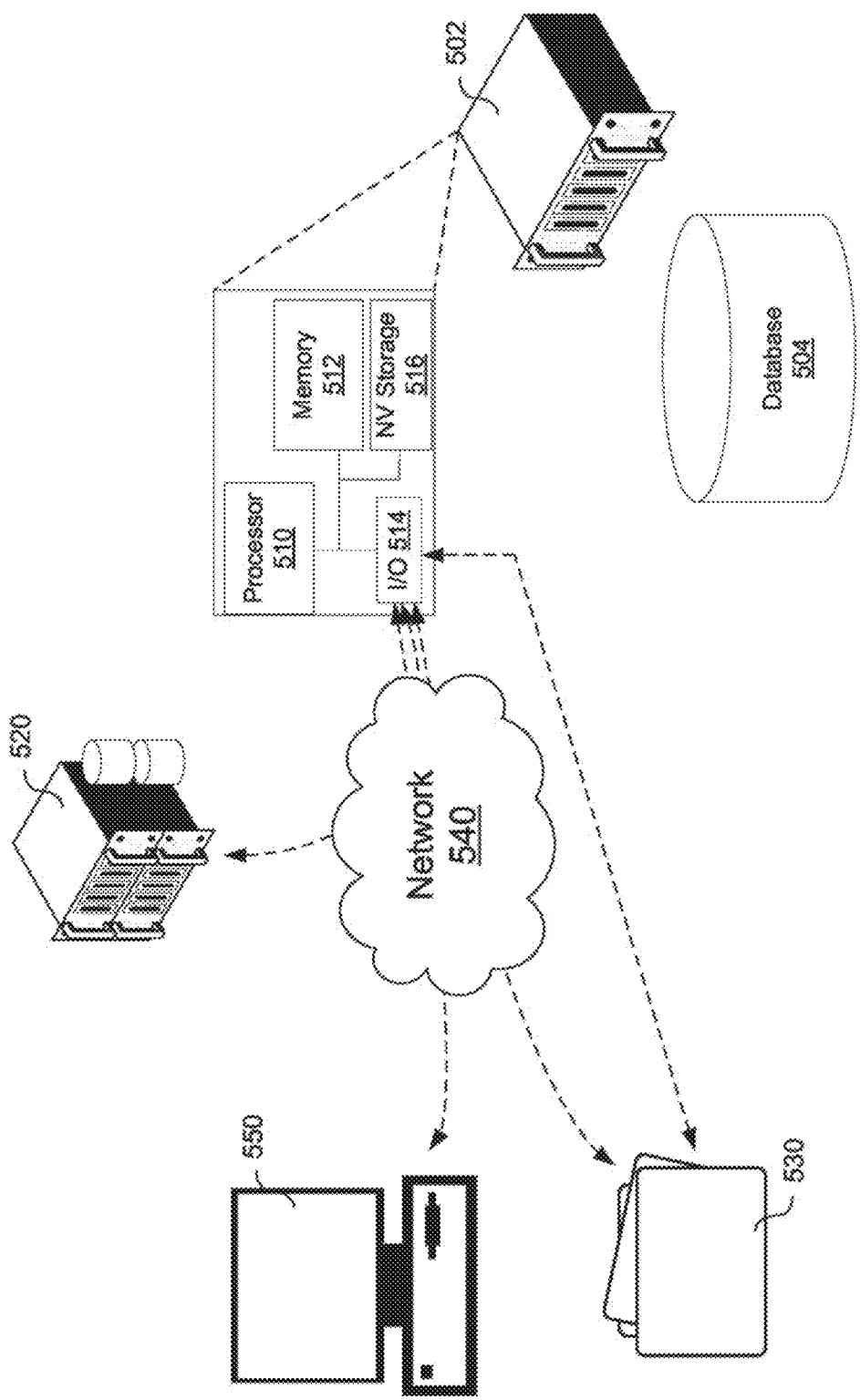
FIG. 5 shows a representation of a system for associating data with non-material concepts.

FIG. 5 shows a representation of a system for associating data with non-material concepts. The system comprises one or more computing elements such as server 502 and a storage element such as database 504. The server 502 comprises a processor module 510, a memory 512, an input/output interface 514, and non-volatile storage 516. The memory 512 stores non-transitory computer-readable instructions which, when executed by the processor module 510, configure the server 502 to perform certain functionality as described herein. For example, the non-transitory computer-readable instructions stored in memory 512, when executed by the processor module 510, may configure the server 502 to function as one or more of the designer component 102, the data ingestion component 110, the AI module 106, and the information retrieval module 120, as has been described with reference to FIG. 1, and the data connector component 304, the transformer component 306, and the cache and messaging component 310, as has been described with reference to FIG. 3. It would also be appreciated that while only one server 502 is shown in FIG. 5, there may be a plurality of computing elements such as the server 502, each configured to perform various functionality of the modules/components as described herein.

Additionally or alternatively, the functionality of one or more of these components/modules may be performed by an external computing device 520, in accordance with instructions sent by the server 502. For example, data ingestion may be performed in a cloud environment such as Google Cloud Platform™, Amazon Web Services™, or Microsoft Azure™ and existing tools such as Spark™ or Kafta™ to perform processing. Furthermore, data connectors may be scheduled to run at different times and may ingest data at different rates.

Data 530 to be ingested may be retrieved by the server 502 via the I/O interface 514 over a network 540 such as the Internet, for example from a private or public database, a web page, etc., or directly inputted into the system (e.g, via a USB drive). The data may be ingested by the server 502 or an external computing device 520 and converted to standard data, as has been previously described. Furthermore, a user, via computer 550, for example, may interact with the server 502 over network 540 to define the concept definition. While a desktop computer is shown as computer 550, various types of computers, such as laptops, tablets, mobile devices, etc., may be used to interact with the server 502 and define the concept definition. The concept definition may be received at the I/O interface 514, for example, which may provide a user interface for the computer 550 to interact with.

Processed standard data and data associated with a concept definition may be stored in the database 504, as has been previously described. An index file may also be stored in the database 504. In response to a search query, for example received at the I/O 514 from the computer 550 over the network 540, the server 502 may be configured to access the database 504 to retrieve the relevant concept definition and associated data, and output a representation of the concept, for example in a user interface.

The processor module 510 may represent a single processor with one or more processor cores or an army of processors, each comprising one or more processor cores. The memory 512 may comprise various types of memory (different standardized or kinds of Random Access Memory (RAM) modules, memory cards. Read-Only Memory (ROM) modules, programmable ROM, etc.). The I/O module 514 represents at least one physical interface that can be used to communicate with other network nodes. The I/O module 514 may be made visible to the other computing devices through one or more logical interfaces. The database 504 may represent one or more logical or physical as well as local or remote hard disk drive (HDD) (or an array thereof). The database 504 may further represent a local or remote database made accessible to the server 502 by a standardized or proprietary interface. The actual stacks of protocols used by the physical network interface(s) and/or logical network interface(s) of the network interface module 514 do not affect the teachings of the present invention. The variants of processor module 510, memory 512, I/O module 514 and database 504 usable in the context of the present invention will be readily apparent to persons skilled in the art. Likewise, even though explicit mentions of the memory 512 and/or the processor module 510 are not made throughout the description of the present examples, persons skilled in the art will readily recognize that such modules are used in conjunction with other components to perform routine as well as innovative steps related to the present invention.

Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

The present invention is not affected by the way the different modules exchange information between them. For instance, the memory module and the processor module could be connected by a parallel bus, but could also be connected by a serial connection or involve an intermediate module (not shown) without affecting the teachings of the present invention.

Figure 6:
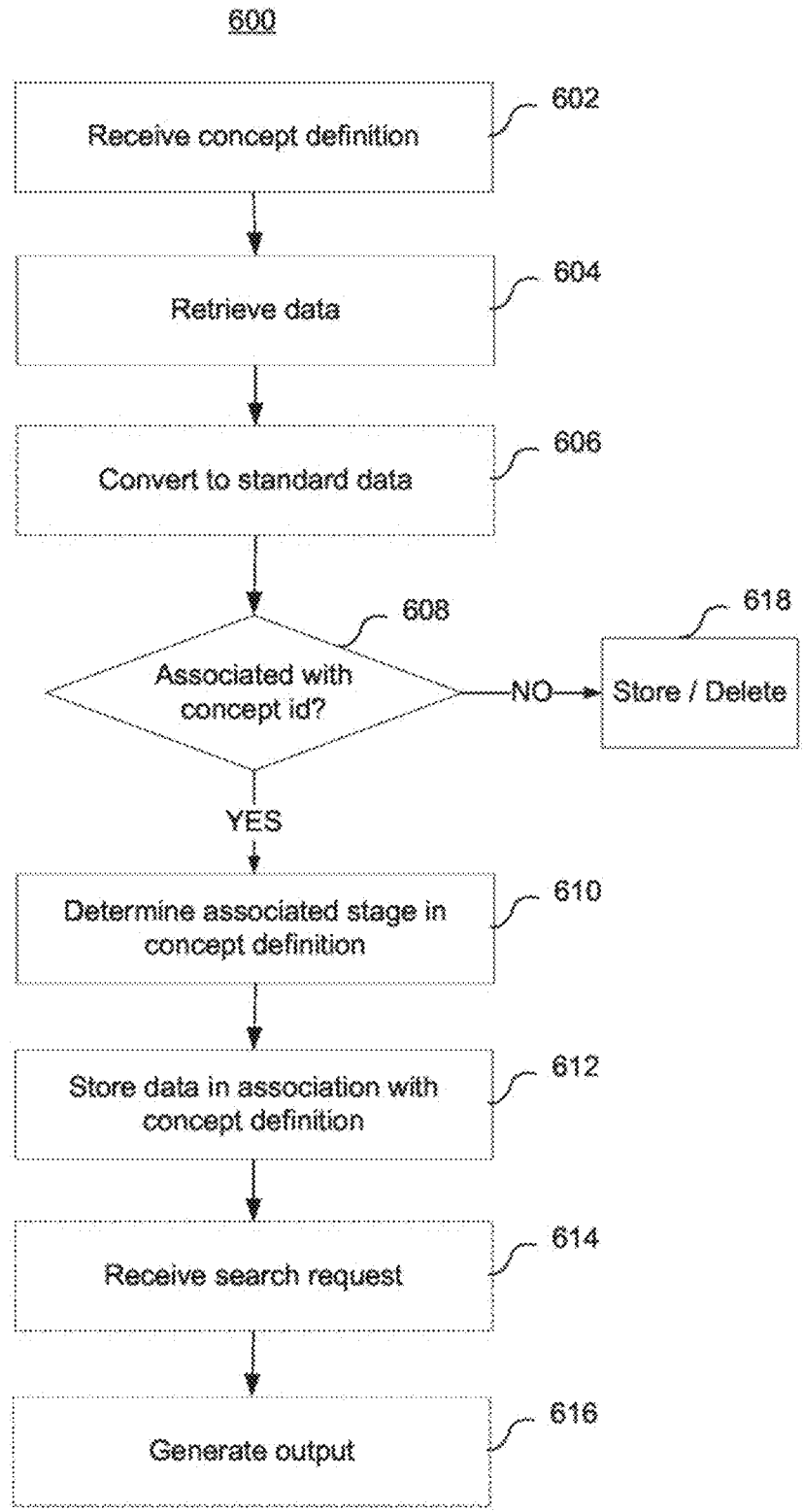
FIG. 6 shows a method of associating data with non-material concepts.

FIG. 6 shows a method 600 of associating data with non-material concepts. A concept definition is received (602). The concept definition comprises a concept identifier and defining a plurality of discrete stages, each of the plurality of discrete stages being related to at least one other discrete stage of the plurality of discrete stages. Data is retrieved (604). The data may be retrieved from a public or private data source. The retrieved data may comprise retrieving a dataset, and the method may be performed on each piece of data individually, or some aspects of the method may be performed using the entire dataset. The method may comprise converting the data into standard data (606), wherein the data is retrieved in an original data format and converted to a standard data format.

A determination is made of whether the data is associated with the concept identifier of the concept definition (608). Determining whether the data corresponds to the concept identifier of the concept definition may comprise identifying the concept identifier in at least one of an original storage location of the data and the data. Alternatively, if the concept identifier is not easily identifiable from the original storage location of the data or the data itself, the data mas first be classified to determine a data class, and this data class may be used to determine the concept identifier by identifying a concept definition that the data class best corresponds to. If the data is not associated with any concept identifier (NO at 608), the data may be stored or deleted (618). In some instances, storing such data may comprise some processing of the data to allow for search and retrieval.

If it is determined that the data is associated with a concept identifier (YES at 608), a determination is made of which discrete stage(s) of the concept definition the data corresponds to (610). For example, the concept definition may define any one or more of: a data class, a time period, an original data format, a data structure, and data content, for each of the plurality of discrete stages, and determining the at least one discrete stage that the data corresponds to may comprise comparing the data with the plurality of discrete stages of the concept definition. If the data has not previously been classified (for example, to determine the concept identifier), the data may be classified to determine a data class by comparing features of the data to specimens of known data classes.

The data stored is in association with the concept identifier and the at least one discrete stage of the concept definition (612). For example, storing the data in association with the concept identifier and the at least one discrete stage of the concept definition may comprise generating a representation of the concept comprising the plurality of discrete stages, associating the data with the at least one discrete stage in the representation, and storing the representation in association with a unique identifier.

As described herein, associating data with a concept definition and storing the data in association with the concept definition allows for search and retrieval of non-material concepts. The method 600 may further comprise receiving a search request (614), and generating an output (616) by retrieving the representation of the concept or by retrieving the stored data in association with the concept definition and generating/outputting a desired representation of the data associated with the concept. An index may be created/populated, and retrieving the representation of the concept may comprise accessing the index to retrieve the unique identifier, and retrieving the representation of the concept using the unique identifier.

Figure 7:
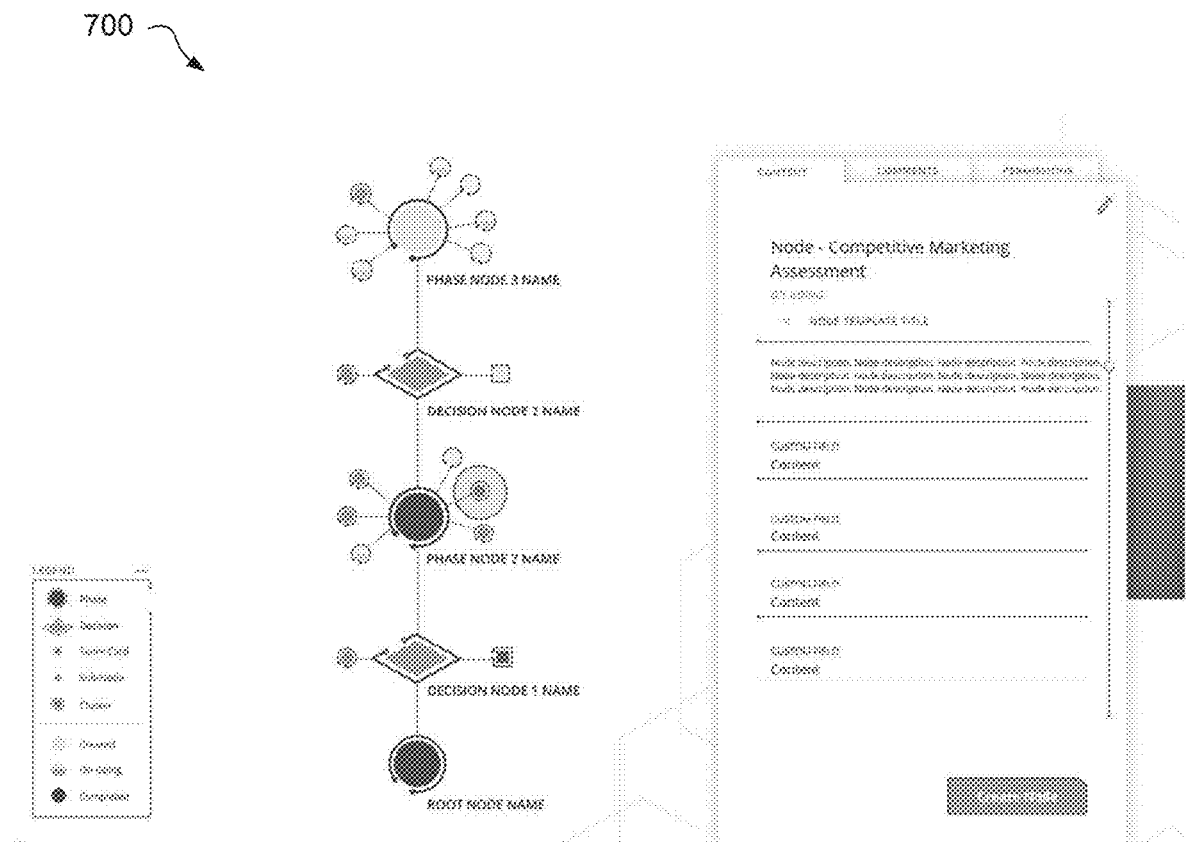
FIG. 7 shows a representation of an output representative of a non-material concept generated by the system.

FIG. 7 shows a representation of an output 700 representative of a non-material concept generated by the system. The output 700 may be provided on a user interface in response to a user query searching for the concept. The output displays a representation of the non-material concept, which may for example be in the form of an interactive graph, a mind map, etc., where ideas, activities and related documents are represented as nodes. Nodes corresponding to stages of the concept are linked to one another in accordance with the concept definition.

The display of data in the output 700 may take different forms. For example, similar nodes may be grouped into clusters to facilitate visualization of complex initiatives. Further, selecting a node may reveal its content, where a user can select data that can be retrieved and edited. It may also be possible to add metadata to any node through comments, permissions & privacy settings. The interface may also provide various keyboard shortcuts & visual tools to facilitate navigation of the graph. A person skilled in the art would readily appreciate that various functionality may be provided to the output without departing from the scope of this disclosure.

It would be appreciated by one of ordinary skill in the art that the system and components shown in Figures may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A system for associating data with a non-material concept, comprising:
   a processor; and
   a memory having stored thereon instructions, which when executed by the processor, configure the system to:
      receive a concept definition comprising a concept identifier and defining a plurality of discrete stages for the non-material concept;
      retrieve the data in an original data format;
      convert the data from the original data format to a standard data format;
      determine whether the data is associated with the concept identifier of the concept definition by identifying the concept identifier in at least one of an original storage location of the data and the data in the standard data format; and
      when the data is determined to be associated with the concept identifier of the concept definition:
         determine, by analyzing the data in the standard data format, at least one corresponding discrete stage from the plurality of discrete stages of the concept definition that the data corresponds to, wherein the system is configured to associate the data to an associated data class using an artificial intelligence module that associates the data according to one or more data classes, and to determine the at least one corresponding discrete stage that the data corresponds to based on a similarity of the associated data class of the data to a data class of the at least one corresponding discrete stage; and
         store the data in association with the concept identifier and the at least one discrete stage of the concept definition.

2. The system of claim 1, wherein each of the plurality of discrete stages are related to at least one other discrete stage of the plurality of discrete stages.

3. The system of claim 1, wherein the data is retrieved from a private data source.

4. The system of claim 1, wherein the data is retrieved from a public data source.

5. The system of claim 1, wherein the concept definition defines any one or more of: a data class, a time period, an original data format, a data structure, and data content, for each of the plurality of discrete stages, and wherein the system is configured to determine the at least one discrete stage that the data corresponds to by comparing the data with the plurality of discrete stages of the concept definition.

6. The system of claim 1, wherein the system is further configured to:
receive a search request associated with the concept identifier;
retrieve a representation of the concept; and
generate an output comprising the representation of the concept.

7. The system of claim 6, wherein the system is configured to generate the representation of the concept comprising the plurality of discrete stages, associate the data with the at least one discrete stage in the representation, and store the representation in association with a unique identifier.

8. The system of claim 7, wherein the system is further configured to generate an index comprising the unique identifier in which the representation of the concept is stored in association with, and wherein the representation of the concept is retrieved by accessing the index to retrieve the unique identifier, the representation of the concept being retrieved using the unique identifier.

9. The system of claim 1, wherein the system is configured to open the data in the original data format and extract the data for converting the data from the original data format to the standard data format.

10. The system of claim 1, wherein the artificial intelligence module associates the data to the associated data class by comparing one or more of an original data format, a data structure, and data content of the data against known data specimens that have been previously associated to the data class.

11. A method of associating data with a non-material concept, comprising:
receiving a concept definition comprising a concept identifier and defining a plurality of discrete stages for the non-material concept;
retrieving the data in an original data format;
converting the data from the original data format to a standard data format;
determining whether the data is associated with the concept identifier of the concept definition by identifying the concept identifier in at least one of an original storage location of the data and the data in the standard data format; and
when the data is determined to be associated with the concept identifier of the concept definition:
determining, by analyzing the data in the standard data format, at least one corresponding discrete stage from the plurality of discrete stages of the concept definition that the data corresponds to, wherein the data is associated to an associated data class using an artificial intelligence module that associates the data according to one or more data classes, and the at least one corresponding discrete stage that the data corresponds to is determined based on a similarity of the associated data class of the data to a data class of the at least one corresponding discrete stage; and
storing the data in association with the concept identifier and the at least one discrete stage of the concept definition.

12. The method of claim 11, wherein each of the plurality of discrete stages are related to at least one other discrete stage of the plurality of discrete stages.

13. The method of claim 11, wherein the data is retrieved from a private data source.

14. The method of claim 11, wherein the data is retrieved from a public data source.

15. The method of claim 11 wherein the concept definition defines any one or more of: a data class, a time period, an original data format, a data structure, and data content, for each of the plurality of discrete stages, and wherein determining the at least one discrete stage that the data corresponds to comprises comparing the data with the plurality of discrete stages of the concept definition.

16. The method of claim 11, further comprising:
receiving a search request associated with the concept identifier;
retrieving a representation of the concept; and
generating an output comprising the representation of the concept.

17. The method of claim 16, further comprising generating the representation of the concept comprising the plurality of discrete stages, associating the data with the at least one discrete stage in the representation, and storing the representation in association with a unique identifier.

18. The method of claim 17, further comprising generating an index comprising the unique identifier in which the representation of the concept is stored in association with, and wherein retrieving the representation of the concept comprises accessing the index to retrieve the unique identifier, the representation of the concept being retrieved using the unique identifier.

19. The method of claim 11, further comprising opening the data in the original data format and extracting the data for converting the data from the original data format to the standard data format.

20. The method of claim 11, wherein the artificial intelligence module associates the data to the associated data class by comparing one or more of an original data format, a data structure, and data content of the data against known data specimens that have been previously associated to the data class.

* * * * *